United States Patent [19]

Mattes et al.

[11] Patent Number: 5,507,171
[45] Date of Patent: Apr. 16, 1996

[54] ELECTRONIC CIRCUIT FOR A TRANSDUCER

[75] Inventors: Michael F. Mattes, Janesville, Wis.; Robert L. Chao, Sunnyvale, Calif.

[73] Assignee: SSI Technologies, Inc., Janesville, Wis.

[21] Appl. No.: 291,871

[22] Filed: Aug. 17, 1994

Related U.S. Application Data

[63] Continuation-in-part of Ser. No. 228,511, Apr. 15, 1994.
[51] Int. Cl.$^6$ .................................................. G01L 19/04
[52] U.S. Cl. .............................. 73/1 B; 73/4 R; 73/708; 73/862.623
[58] Field of Search ........................... 73/1 B, 1 C, 4 R, 73/115, 765, 766, 769, 708, 862.622, 862.623; 374/172, 173, 183, 185; 177/211; 338/3, 4, 42, 47

[56] References Cited

U.S. PATENT DOCUMENTS

| | | | |
|---|---|---|---|
| 4,465,075 | 8/1984 | Swartz | 128/672 |
| 4,576,052 | 3/1986 | Sugiyama | 73/862.622 |
| 4,582,976 | 4/1986 | Merrick | 219/121 LJ |
| 4,705,964 | 11/1987 | Higgs | 307/278 |
| 4,744,863 | 5/1988 | Guckel et al. | 156/653 |
| 4,766,655 | 8/1988 | Hickox | 29/25.35 |
| 4,777,826 | 10/1988 | Rud, Jr. et al. | 73/708 |
| 4,792,782 | 12/1988 | Hammond | 338/309 |
| 4,803,457 | 2/1989 | Chapel, Jr. et al. | 338/195 |
| 4,821,822 | 4/1989 | Kitagawa et al. | 177/211 |

(List continued on next page.)

FOREIGN PATENT DOCUMENTS

| | | | |
|---|---|---|---|
| 561878 | 6/1977 | U.S.S.R. | 374/172 |
| 2201791 | 9/1988 | United Kingdom | 73/708 |

OTHER PUBLICATIONS

Motorola Pressure Sensor Device Data; Motorola, Inc., 1990.
Eugene Svoboda, "Passive Compensation of a Monolithic Silicon Pressure Transducer", Sensym, Inc., 1986.
P. E. M. Frere, S. J. Prosser, "Temperature Compensation of Silicon Pressure Sensors For Automotive Applications", Lucas Research Centre, Lucas Engineering & Systems Ltd., U.K., pp. 270–274.
Yamada, et al., "A Piezoresistive Integrated Pressure Sensor", Sensors and Actuators, 4 (1983); pp. 63–69.
Xian–Ping Wu, et al., "An Integrated Pressure Transducer For Biomedical Applications", Sensors and Actuators, 2 (1982); pp. 309–320.
Willig, "Operational Amplifiers", EXAMplifications, May/Jun. 1993; pp. 256–258.
Poff, "Stable Miniature Pressure Transducer Using Inorganic Bonding Construction", Endevco Corporation, 1987; pp. 373–382.
Williams, "Good bridge–circuit design satisfies gain and balance criteria", EDN Designers' Guide to Bridge Circuits, Oct. 25, 1990; pp. 161–174.
Dresser Industries Brochure—Ashcroft "Model K1 Thin Film Pressure Transmitter".
Sensotec Brochure—"Subminiature Pressure Transducers", pp. 10–11.
Schultz, "Amplifiers for Semiconductor Pressure Sensors", Motorola Semiconductor Products, pp. 291–298.

Primary Examiner—Robert Raevis
Attorney, Agent, or Firm—Michael, Best & Friedrich

[57] ABSTRACT

A transducer for generating an amplified signal in response to a stimulus. The transducer includes a sensing structure for sensing a stimulus and for generating a signal functionally related to the stimulus. An amplifier circuit, utilizing a single amplifier, amplifies the signal by a predetermined gain. Resistive elements in the amplified circuit are formed on the same substrate as the sensing structure and define the predetermined gain of the amplifier circuit. The transducer generates a signal having zero magnitude in response to zero pressure on the sensing structure and has fewer than seven resistors requiring laser trimming.

20 Claims, 2 Drawing Sheets

U.S. PATENT DOCUMENTS

| | | | |
|---|---|---|---|
| 4,853,669 | 8/1989 | Guckel et al. | 338/4 |
| 4,901,052 | 2/1990 | Chapel, Jr. et al. | 338/308 |
| 4,906,966 | 3/1990 | Imamura et al. | 338/195 |
| 4,907,341 | 3/1990 | Chapel, Jr. et al. | 29/612 |
| 4,996,082 | 2/1991 | Guckel et al. | 427/99 |
| 5,042,307 | 8/1991 | Kato | 73/708 |
| 5,187,985 | 2/1993 | Nelson | 73/708 |
| 5,197,334 | 3/1993 | Guziak | 73/708 |
| 5,206,623 | 4/1993 | Rochette et al. | 338/203 |
| 5,243,319 | 9/1993 | Brokaw | 338/195 |
| 5,363,084 | 11/1994 | Swinehart | 338/308 |

ELECTRONIC CIRCUIT FOR A TRANSDUCER

RELATED APPLICATIONS

This application is a continuation-in-part patent application of U.S. patent application Ser. No. 08/228,511 titled "ELECTRONIC CIRCUIT FOR A TRANSDUCER" filed Apr. 15, 1994.

BACKGROUND OF THE INVENTION

This invention relates to transducers, and in particular, to transducers having a full-bridge sensing structure and an amplifier circuit connected to the sensing structure.

Transducers, in particular, transducers incorporating a full-bridge (also called a "wheatstone" bridge) sensing structure are used in a variety of areas including automotive and industrial applications to measure pressures, temperatures and other parameters. In automobiles for example, pressure sensors monitor, among other things, oil pressure and transmission fluid pressure.

It is known to include in such a transducer a full-bridge sensing structure to generate a differential voltage output in response to a stimulus and an amplifier circuit connected to the sensing structure to amplify the differential voltage output. Using the pressure sensor example from above, the sensing structure senses a pressure within a system and generates a signal functionally related to that pressure. The signal is then amplified and provided as the output of the transducer.

It is also known in the art to calibrate the output of an integrated circuit transducer through the process of laser trimming of resistors in the circuit. Laser trimming is achieved by making laser cuts in the polysilicon resistor material to increase the resistance of the resistor in the circuit and thereby modifying in a precise way the characteristics of the circuit.

In one known construction, the sensing structure and the amplifier circuitry are provided as discrete or separate integrated circuit components. However this construction substantially increases the cost of manufacturing the sensor because both the sensing bridge resistors and the amplifier biasing resistors require laser trimming or calibration prior to connecting the circuits together to form the complete transducer circuit. Moreover, once the sensing bridge and the amplifier circuit are electrically connected, testing and additional trimming or calibration is required to assure that the two circuits are appropriately matched and that the sensor is functioning properly.

One attempt to solve the above-identified problems led to the development of a fully integrated pressure sensor as shown in the Motorola Semiconductor Technical Data Sheet illustrating a Motorola "MPX5050" Pressure Sensor. However, to insure accuracy of the pressure sensor output signal, the amplifier circuit requires a plurality of amplifiers connected in the instrumentation mode and includes at least seven integrated resistors requiring costly laser trimming.

SUMMARY OF THE INVENTION

The invention provides a transducer including a circuit having a full-bridge sensing structure for generating an electrical output functionally related to a stimulus, an amplifier connected to the sensing structure and a plurality of biasing resistors for setting the gain of the amplifier. The entire circuit is preferably, though not necessarily, formed on a single substrate so that only two of the resistors in the entire transducer circuit require laser trimming or calibration. Additionally, the circuit requires only three external connections: one to connect the circuit to a single sided power source, one to connect the circuit to a common or ground connection and one output connection on which the output signal is provided and which is adapted to be connected to signal processing circuitry for receiving the output signal that is functionally related to the stimulus.

While not essential to the operation of the transducer circuit a buffer amplifier may be formed on the integrated circuit chip with the sensing bridge and the amplifier. The buffer amplifier is an operational amplifier connected in the voltage follower mode. The buffer amplifier isolates the voltage fed into the amplifier circuit so as to prevent excessive loading of one side of the full bridge.

A principal advantage of the invention is the provision of a transducer circuit having a sensing structure and an amplifier circuit on the same substrate.

It is another advantage of the invention to provide a circuit for a full-bridge transducer that requires only a single side power supply.

It is another advantage of the invention to provide a circuit for a full-bridge transducer where neither arm of the bridge is loaded by an inverting input to an operational amplifier.

It is another advantage of the invention to provide a transducer circuit which is simple and inexpensive to manufacture.

It is another advantage of the invention to provide a fully integrated transducer circuit utilizing a simple two amplifier circuit design to generate an accurate electronic signal functionally related to the stimulus.

It is another advantage of the invention to provide a fully integrated pressure sensor or temperature sensor, which sensor requires a minimal amount of laser trimming, i.e., calibration.

Other features and advantages of the invention will become apparent to those skilled in the art upon review of the following detailed description, claims and drawings.

Figure 1:
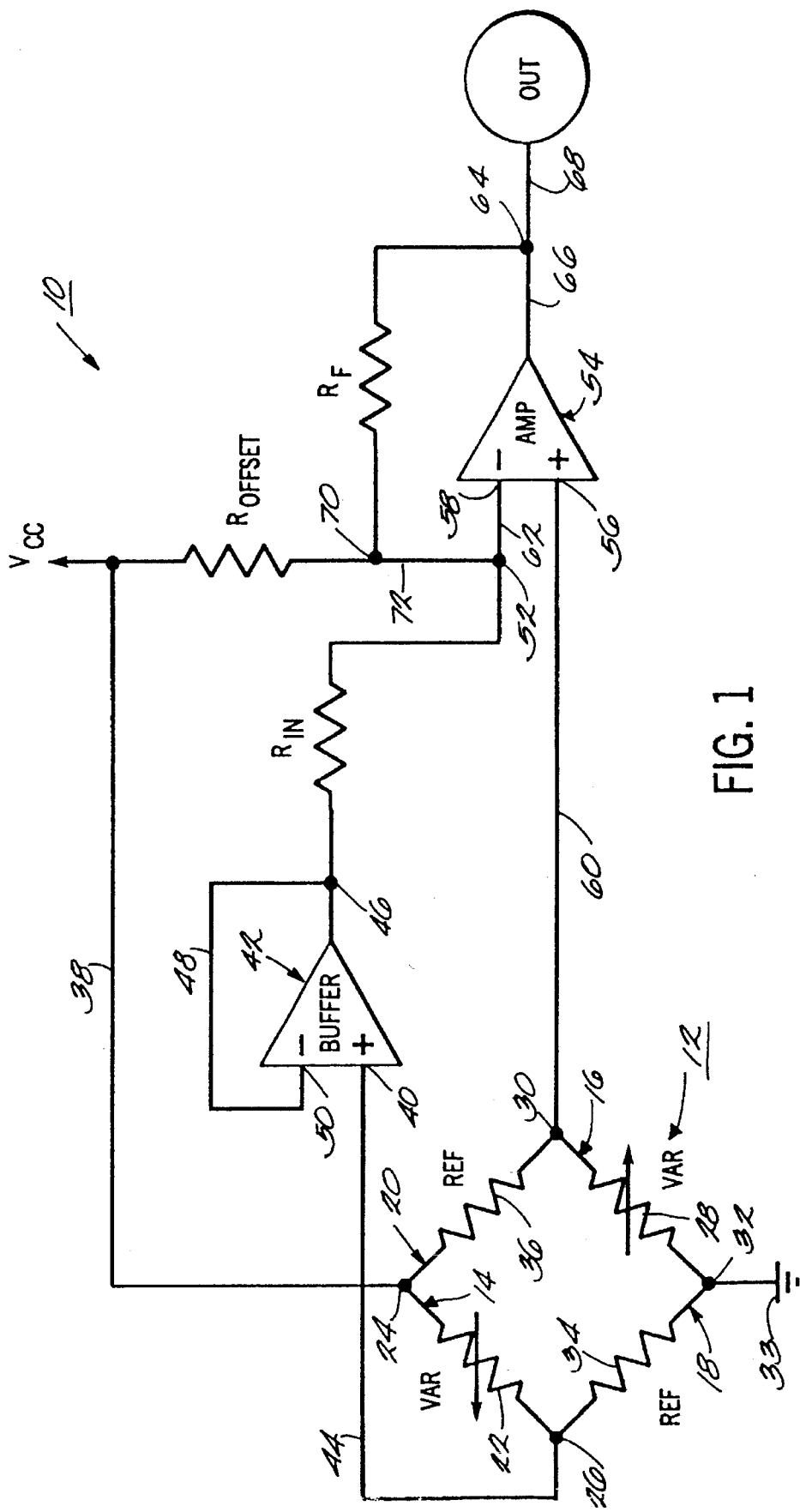
FIG. 1 is an electrical schematic diagram of a transducer embodying the invention.

Before one embodiment of the invention is explained in detail, it is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting.

DETAILED DESCRIPTION OF THE PREFERRED EMBODIMENT

A transducer embodying the invention is generally designated by the reference number 10 in FIG. 1. The transducer includes a resistor bridge 12 having four resistor arms 14, 16, 18, and 20. In the preferred embodiment, the bridge comprises a Wheatstone bridge and, while the circuit of the invention is equally applicable for use with other types of transducers employing a full-bridge sensing structure (such as, for example, a temperature sensor), the transducer shown in the drawings is a pressure sensor. Such a pressure sensor is shown and described in U.S. Pat. Nos. 4,744,863; 4,853,669; and 4,996,082; which are incorporated herein by reference.

Resistor arm 14 includes a piezoresistive element 22 which interconnects junctions 24 and 26. The resistance of the piezoresistive element 22 increases linearly with an increase in pressure exerted on the element 22.

A second piezoresistive element 28 is included in resistor arm 16. Piezoresistive element 28 interconnects junctions 30 and 32. As with piezoresistive element 22, the resistivity of piezoresistive element 28 increases linearly with an increase in pressure exerted on the bridge 12.

A first constant resistance element 34 interconnects junctions 26 and 32. Junction 32 is connected to ground 33. A second constant resistance element 36 interconnects junctions 24 and 30. Junction 24 is connected to a source voltage, $V_{cc}$, by line 38.

Junction 26 is also connected to the positive (non-inverting) input terminal 40 of an operational amplifier 42 by line 44. The output of operational amplifier 42 is supplied to junction 46. Line 48 interconnects junction 46 with the negative (inverting) input terminal 50 on operational amplifier 42. Junction 46 is also interconnected to junction 52 by an input resistor, $R_{in}$.

A second operational amplifier 54 having a positive (non-inverting) input terminal 56 and a negative (inverting) input terminal 58 is provided. Positive terminal 56 is connected to junction 30 of bridge 12 by line 60. Negative terminal 58 is connected to junction 52 by line 62. The output of operational amplifier 54 is connected to junction 64 by line 66. Line 68 carries the output signal of the transducer 10 from junction 64 to any appropriate signal monitoring circuitry. As described, operational amplifier 54, hereinafter referred to as a differential amplifier, is connected in the differential mode so as to amplify the difference between the voltage at junction 46 and the voltage at junction 30.

Figure 2:
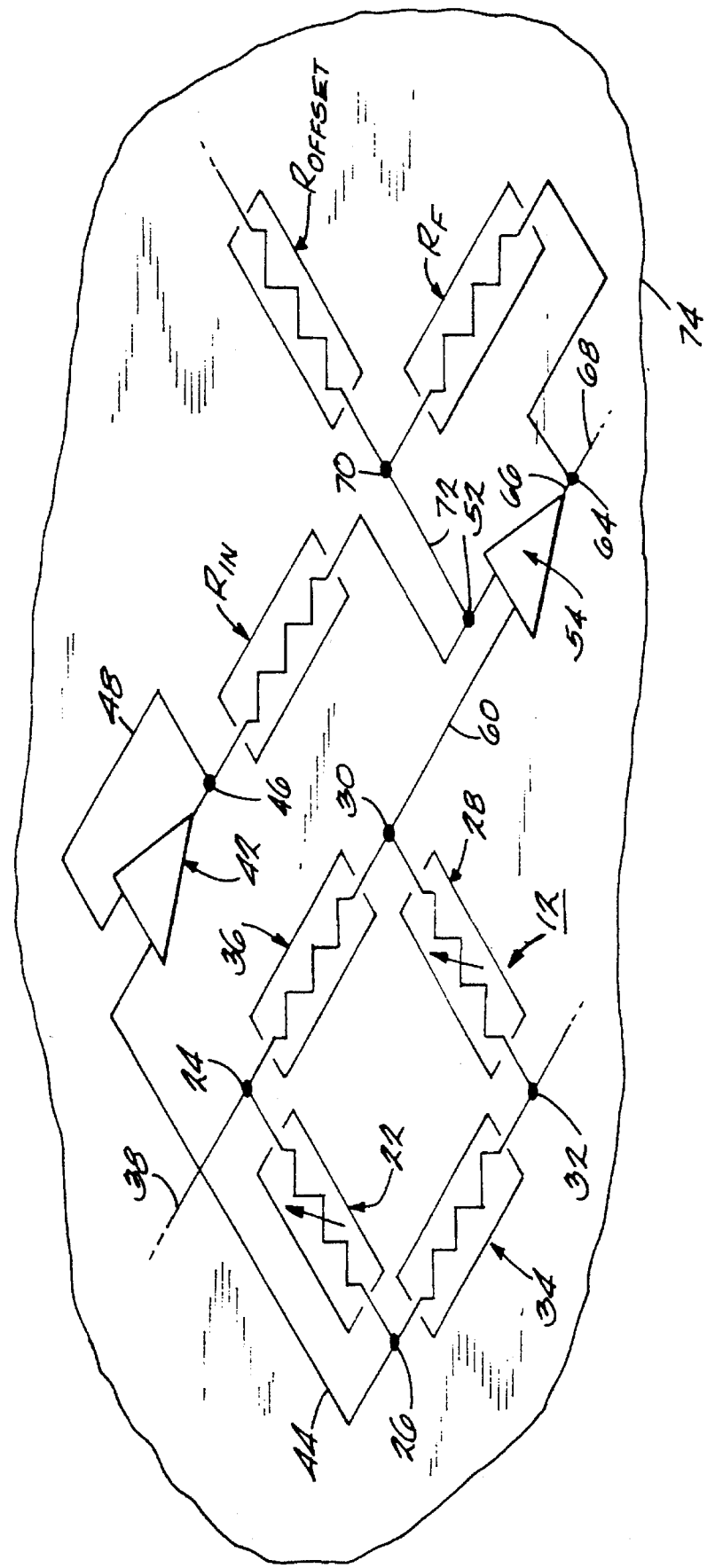
FIG. 2 is a partial isometric view of the transducer of FIG. 1.

A feedback resistor, $R_f$, interconnects junction 64 and junction 70. Junction 70 and junction 52 are connected by line 72. Junction 70 is also connected to voltage source, $V_{cc}$, through offset resistor, $R_{OFFSET}$. In the preferred embodiment, offset resistor $R_{OFFSET}$ has a resistance substantially equal to the resistance of the feedback resistor $R_f$. As shown in FIG. 2, the resistors $R_{in}$, $R_{OFFSET}$ and $R_f$ are formed of a thin film of polysilicon on the same substrate as sensing bridge 12 and operational amplifier 54 of an integrated circuit chip. Because of the simplicity of the circuit, only the resistors $R_{OFFSET}$ and $R_f$ require calibration through laser trimming.

In operation, the substrate 74 including the transducer circuit 10 is positioned in the system of pressure to be measured. At zero pressure, piezoresistive elements 22 and 28 have the same resistance as the constant resistance elements 34 and 36. As a result of the voltage dividing action of bridge 12, the voltage at junction 26 will be equal to one-half the source voltage $V_{cc}$. Likewise, since piezoresistive element 28 and constant resistance element 36 have the same resistance at zero pressure, the voltage at junction 30 is equal to one-half the source voltage $V_{cc}$.

Operational amplifier 42 is connected in a voltage follower configuration to act as a buffer amplifier. Buffer amplifier 42 isolates the voltage at line 40 from differential amplifier 54 so as to prevent excess current loading of junction 26. The output voltage of buffer amplifier 42 at junction 46 is substantially equal to the input voltage at terminal 40 of buffer amplifier 42.

Differential amplifier 54 is designed to produce an amplified signal corresponding to the difference between the voltages at junction 26 and junction 30 of bridge 12. The following equation represents the output voltage of differential amplifier 54 at junction 64:

$$\text{Output} = \left[1 + \frac{R_f}{R_{parallel}}\right] \times V_{pbridge} - \left[\frac{R_f}{R_{in}}\right] \times V_{nbridge} - \left[\frac{R_f}{R_{offset}}\right] \times V_{cc}$$

wherein:

$R_{OFFSET}$=Resistance of $R_{OFFSET}$ $R_{IN}$=Resistance of $R_{IN}$ $R_f$=Resistance of $R_{FEEDBACK}$ $$R_{parallel} = \frac{(R_{in}) \times R_{OFFSET}}{(R_{in}) + R_{OFFSET}}$$

$V_{pbridge}$=Voltage at junction 30 of bridge 12

$V_{nbridge}$=Voltage at junction 46

$V_{cc}$=Source voltage

As previously discussed, at zero pressure, the voltage at junction 46 is substantially equal to one-half the source voltage, $V_{cc}$. Likewise, the voltage at junction 30 is equal to one-half the source voltage, $V_{cc}$. The resistance of the feedback resistor $R_f$ is equal to the resistance of the offset resistor $R_{OFFSET}$ at all pressures. The resistance of the feedback resistor is also equal to the input resistor $R_{in}$ multiplied by the desired gain. By substitution in the above described equation, it is determined that at zero pressure, the circuit is designed to produce an output signal of zero volts at junction 64. As such, at zero pressure, the output signal at junction 64 is initialized. In cases where the transducer circuit 10 is used to measure temperatures, a reference temperature can be selected at which the sensing structure is balanced and at which the output (OUT) is zero volts.

Referring again to bridge 12, an increase in pressure will increase the resistance of piezoresistive elements 22 and 28. When the resistance of piezoresistive element 28 is increased, the voltage at junction 30 is also increased. On the other hand, as the resistance of piezoresistive element 22 is increased, the voltage at junction 26 will decrease. This, in turn, lowers the voltage at junction 46. It can be seen from the above described equation that by increasing the voltage at junction 30 and by decreasing the voltage at junction 46, the output voltage of differential amplifier 54 at junction 64 will linearly increase. The maximum output voltage of differential amplifier 54 is designed to equal $V_{cc}$. $V_{cc}$ is usually five volts d.c. and, when the circuit is properly calibrated, the circuit will output five volts d.c. at the maximum pressure (or other parameter) that the transducer is designed to measure; e.g., 50–3000 psia.

In order to illustrate how the transducer circuit is calibrated, assume that the pressure sensor is designed to measure up to 500 psia and that it has a representative sensitivity of 40 microvolts per psia. Two pressures are applied to the transducer and the resulting outputs of the differential amplifier 54 are measured. These measurements yield a linear output voltage to pressure curve. The actual intercept (voltage output at zero pressure) and actual slope of the voltage output versus pressure curve are calculated (for the purposes of this example, assume that the actual slope has been calculated to be m=0.008) and compared with the desired or ideal slope, which is:

$$\begin{aligned}\text{desired slope} &= V_{cc}/\text{psia}_{max} \\ &= 5.0\text{ Volts}/500\text{ psia} \\ &= 0.01\end{aligned}$$

A gain multiplier (k) is then calculated by dividing the actual slope into the desired slope.

$$\begin{aligned}k &= (\text{desired slope})/(\text{actual slope}) \\ &= 0.01/0.008 \\ &= 1.25\end{aligned}$$

Therefore, by increasing the gain by a factor of k=1.25, the desired maximum output response is achieved. Because $$\text{gain}=R_f/R_{in};$$

the gain may be increased by a factor of k=1.25. This is achieved by laser trimming $R_f$ to achieve the desired resistance value for $R_f$.

The gain adjustment adds a "zero offset" to the output of differential amplifier 54 (i.e., at zero psia, the output voltage does not equal zero). This is eliminated by increasing $R_{offset}$ by the same factor (gain multiplier (k)) used to multiply the resistance of $R_f$.

If it is determined that, instead of increasing the gain, it is necessary to decrease the gain, then the resistance of $R_{in}$ may be adjusted (increased) instead of the resistance of $R_f$. Adjustment of $R_{in}$ will not result in any zero offset of the output of differential amplifier 54.

If the circuit is used in an environment subjected to varying temperatures, then some method of compensating for temperature induced variations of the differential output of the sensing structure should be provided. While many previously known temperature compensation circuits are appropriate, the method and apparatus of the preferred embodiment is shown and described in the United States Continuation-in-Part Patent Application which is titled "Improved Method And Apparatus For Compensating For Temperature Fluctuations In The Input To A Gain Circuit" (Attorney Docket No. 83141/9006A), which names inventors Michael Mattes and James Seefeldt and which is filed concurrently herewith and which is a Continuation-In-Part Patent Application of U.S. patent application Ser. No. 08/228,511 filed Apr. 15, 1994.

Various features and advantages of the invention are set forth in the following claims.

We claim:

1. A transducer circuit which generates an amplified signal in response to a stimulus and functionally related to the stimulus, the transducer circuit comprising:

a sensing bridge adapted to be operatively connected to a power source, the sensing bridge providing a voltage output functionally related to the stimulus; and an amplifier circuit connected to the sensing bridge for amplifying the differential voltage output of the sensing bridge and providing an amplified signal as an output, the amplifier circuit including an amplifier and at least one but fewer than five trimmed thin film resistors.

2. The transducer circuit of claim 1 wherein the amplifier circuit and the sensing bridge are formed on a single substrate such that the entire transducer circuit is formed on the substrate.

3. The transducer circuit of claim 1 wherein the sensing bridge includes at least two sensing elements.

4. The transducer circuit of claim 3 wherein the sensing elements are piezoresistors and wherein the resistance of the piezoresistors varies in response to pressure applied to the piezoresistors such that the differential voltage output of the sensing bridge is functionally related to the pressure on the piezoresistors.

5. The transducer circuit of claim 3 wherein the sensing elements are integrated resistors and wherein the resistance of the resistors varies in relation to the temperature of the resistors such that the differential voltage output of the sensing bridge is functionally related to the temperature of the resistors.

6. The transducer circuit of claim 1 wherein the amplifier circuit further comprises a buffer amplifier operatively connected to the sensing bridge and to the amplifier so as to buffer the differential output voltage of the sensing bridge.

7. The transducer circuit of claim 1 wherein no more than two of the thin film resistors are trimmed.

8. The transducer circuit of claim 1 wherein the resistors further comprise an offset resistor, a feedback resistor and an input resistor, wherein the gain of the amplifier is defined by the input resistor, and the feedback resistor, and wherein the offset resistor and the feedback resistor are operatively associated with a feedback path for the amplifier.

9. The transducer circuit of claim 8 wherein the resistance of the offset resistor is substantially equal to the resistance of the feedback resistor.

10. A transducer circuit which generates an amplified signal functionally related to a stimulus, the transducer circuit comprising:

a sensing bridge adapted to be operatively connected to a power source, and generating a sensing bridge output functionally related to the stimulus; and an amplifier circuit connected to the sensing bridge for amplifying the sensing bridge output and providing an amplified signal as an output, the amplifier circuit including an amplifier, and at least one but no more than four trimmed, thin film polysilicon resistors formed on a substrate to bias the amplifier.

11. A transducer circuit of claim 10 wherein the sensing bridge and the amplifier circuit are formed on the substrate such that the entire transducer circuit is on the substrate.

12. The transducer circuit of claim 10 wherein the sensing bridge includes at least two sensing elements.

13. The transducer circuit of claim 12 wherein the sensing elements are piezoresistors and wherein the resistance of the piezoresistors varies in response to pressure applied to the piezoresistors such that the differential voltage output of the sensing bridge is functionally related to the pressure on the piezoresistors.

14. The transducer circuit of claim 12 wherein the sensing elements are integrated resistors and wherein the resistance of the resistors varies in relation to the temperature of the resistors such that the differential voltage output of the sensing bridge is functionally related to the temperature of the resistors.

15. The transducer circuit of claim 10 wherein the resistance of two of the resistors are substantially equal.

16. The transducer circuit of claim 10 wherein no more than two of the thin film resistors are trimmed.

17. A transducer circuit which generates an amplified signal having a magnitude functionally related to a stimulus, the transducer circuit comprising:

a sensing bridge formed on a substrate and adapted to be operatively connected to a power source, the sensing bridge generating first and second output voltages functionally related to the stimulus and including first and second resistive sensing elements such that the resistance of the sensing elements varies in response to the stimulus to vary the first and second output voltages, respectively; and an amplifier circuit including only one buffer formed on the substrate, the buffer having an output junction and being connected to the sensing bridge to receive the first output voltage as an input and generate a buffer output on the output junction so as to prevent excess current loading of the sensing bridge, only one amplifier formed on the substrate and having a first input connected to the buffer output junction and a second input connected to the sensing bridge to receive the second output voltage such that the amplifier amplifies the difference between the first and second output voltages and provides an amplified output functionally related to the stimulus, and a plurality of resistors formed on the substrate such that the entire amplifier circuit is on the substrate, and wherein the resistors are operatively connected to the amplifier such that each resistor has a predetermined resistance to define the gain of the amplifier and wherein only two of the thin film resistors are trimmed.

18. The transducer circuit of claim 17 wherein the sensing elements are piezoresistors and wherein the resistance of the sensing elements varies in response to pressure applied to the piezoresistors such that the differential voltage output of the sensing bridge is functionally related to the pressure on the piezoresistors.

19. The transducer circuit of claim 17 wherein the sensing elements are integrated resistors and wherein the resistance of the sensing elements varies in relation to the temperature of the resistors such that the differential voltage output of the sensing bridge is functionally related to the temperature of the resistors.

20. The transducer circuit of claim 1 wherein the amplifier includes a non-inverting input, wherein the sensing bridge includes first and second output connections for transmitting the differential voltage output and wherein the amplifier circuit further comprises a buffer having a non-inverting input such that the first output connection is connected to said buffer non-inverting input and said second output connection is connected to said amplifier non-inverting input.

* * * * *